(12) United States Patent
Yuan et al.

(10) Patent No.: US 11,016,320 B2
(45) Date of Patent: May 25, 2021

(54) DISPLAY DEVICE WITH VIEWING ANGLE SWITCHING, DISPLAY METHOD AND FABRICATION METHOD THEREOF

(71) Applicant: Shanghai AVIC OPTO Electronics Co., Ltd., Shanghai (CN)

(72) Inventors: Conglong Yuan, Shanghai (CN); Longcai Xin, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/719,036

(22) Filed: Dec. 18, 2019

(65) Prior Publication Data
US 2021/0048702 A1 Feb. 18, 2021

(30) Foreign Application Priority Data
Aug. 15, 2019 (CN) .......................... 201910752643.4

(51) Int. Cl.
| | | |
|---|---|---|
| *G02F 1/1333* | (2006.01) | |
| *G02F 1/1335* | (2006.01) | |
| *G02F 1/1343* | (2006.01) | |
| *G02F 1/137* | (2006.01) | |
| *G02F 1/1337* | (2006.01) | |

(52) U.S. Cl.
CPC ...... *G02F 1/133308* (2013.01); *G02F 1/1343* (2013.01); *G02F 1/13706* (2021.01); *G02F 1/13725* (2013.01); *G02F 1/133528* (2013.01); *G02F 1/133753* (2013.01); *G02F 1/133757* (2021.01); *G02F 1/133545* (2021.01)

(58) Field of Classification Search
None
See application file for complete search history.

(56) References Cited

U.S. PATENT DOCUMENTS

| | | | | |
|---|---|---|---|---|
| 2019/0121204 A1* | 4/2019 | Lin | ................... | G02F 1/134309 |
| 2020/0064666 A1* | 2/2020 | Xin | ..................... | G02F 1/13737 |

FOREIGN PATENT DOCUMENTS

| | | |
|---|---|---|
| CN | 204557017 U | 8/2015 |
| CN | 107340662 A | 11/2017 |

* cited by examiner

*Primary Examiner* — Phu Vu
(74) *Attorney, Agent, or Firm* — Anova Law Group PLLC (57) ABSTRACT

A display device with viewing angle switching, and its display method and fabrication method are provided. The display device includes a display module and a guest-host effect box. The guest-host effect box includes a first substrate, a second substrate, and a display dielectric layer. A first transparent electrode is disposed on a surface of the first substrate and a second transparent electrode is disposed on a surface of the second substrate. A first alignment film layer is disposed on a surface of the first transparent electrode, and a second alignment film layer is disposed on a surface of the second transparent electrode. When a bias voltage is not applied to the first and second transparent electrodes, a display mode is a narrow viewing angle mode; and when the bias voltage is applied to the first and second transparent electrodes, the display mode is a wide viewing angle mode.

20 Claims, 6 Drawing Sheets

DISPLAY DEVICE WITH VIEWING ANGLE SWITCHING, DISPLAY METHOD AND FABRICATION METHOD THEREOF

CROSS-REFERENCE TO RELATED APPLICATION

This application claims the priority of Chinese Patent Application No. 201910752643.4, filed on Aug. 15, 2019, the content of which is incorporated herein by reference in its entirety.

TECHNICAL FIELD

The present disclosure generally relates to the field of display technology and, more particularly, relates to a display device with viewing angle switching, and its display method and fabrication method.

BACKGROUND

With the society development, people become more dependent on electronic devices. Modern display devices, including applications of mobile phone terminals, desktop displays or notebook computers, have gradually developed toward a wide viewing angle trend. What follows is that, when using some electronic devices, certain information may not want to be viewed by others. Therefore, when dealing with confidential matters, people may normally adopt a narrow viewing angle mode to avoid screen information leakage which may cause commercial loss or embarrassment. In addition to the demand for the wide viewing angle, the display devices may be required to have a switching function between the wide viewing angle and the narrow viewing angle in various situations. Currently, multiple methods for implementing the switching between the wide viewing angle and the narrow viewing angle of the display devices may be the following.

The first method is to attach an anti-peeping film to a display screen. When anti-peeping is required, the anti-peeping film may be used to cover the screen to reduce the viewing angle. However, such method may require additional preparation of the anti-peeping film, which may cause great inconvenience to a user. In addition, one anti-peeping film may only be for one viewing angle, and once the anti-peeping film is attached, the viewing angle may be fixed, which may only implement the narrow viewing angle mode, and may not display the wide viewing angle mode.

The second method is to provide a dual light source backlight system in a liquid crystal display device, which may adjust the viewing angle of the liquid crystal display device. The dual light source backlight system may be composed of two layers of stacked light guide plates and combined with a reverse prism sheet. A top-layer light guide plate combined with the reverse prism sheet may change a light direction, so that the light may be limited to a relatively narrow angular range, thereby implementing the narrow viewing angle of the liquid crystal display device. The function of a bottom-layer light guide plate combined with the reverse prism sheet may be used to implement the wide viewing angle of the liquid crystal display device. However, the dual light source backlight system may increase the thickness and cost of the liquid crystal display device, which may not satisfy the development trend of the thin and light-weighted liquid crystal display device.

The third method is to divide drive electrodes on a panel of the liquid crystal display device into two types, where one type is a wide viewing angle display drive electrode, and the other type is a viewing angle control electrode. When a desirable voltage is applied to the viewing angle control electrode, appropriate light leakage may be generated by the liquid crystal display device, thereby implementing the switching between the wide viewing angle and the narrow viewing angle. However, two electrodes including the wide viewing angle display drive electrode and the viewing angle control electrode may be required to be disposed on the liquid crystal display device, which may reduce an aperture ratio of the liquid crystal display device, decrease the panel brightness of the liquid crystal display device, and increase the process complexity.

Therefore, there is a need to provide a display device with viewing angle switching, and its display method and fabrication method, which may adopt a light alignment technology and be applicable to multiple display devices, and may not require complicated drive and have a convenient switching between the wide and narrow viewing angles with desirable effect.

SUMMARY

One aspect of the present disclosure provides a display device with viewing angle switching. The display device includes a display module and a guest-host effect box, oppositely configured to each other, where the guest-host effect box is on a side of a light exiting surface of the display module; the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules; a first transparent electrode is disposed on a surface of the first substrate facing toward the display dielectric layer, and a second transparent electrode is disposed on a surface of the second substrate facing toward the display dielectric layer; and a first alignment film layer is disposed on a surface of the first transparent electrode facing toward the display dielectric layer, and a second alignment film layer is disposed on a surface of the second transparent electrode facing toward the display dielectric layer; an alignment direction of the first alignment film layer and an alignment direction of the second alignment film layer are same and horizontally aligned; the first alignment film layer includes a plurality of first alignment regions and second alignment regions alternatingly disposed along a first direction; an alignment direction of a first alignment region is perpendicular to an alignment direction of a second alignment region; the second alignment film layer includes a plurality of third alignment regions and fourth alignment regions alternatingly disposed along the first direction; and the first direction is parallel with a plane of the first substrate; along a direction perpendicular to the light exiting surface of the display module, the first alignment regions and the third alignment regions are overlapped, and the second alignment regions and the fourth alignment regions are overlapped; and when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode.

Another aspect of the present disclosure provides a fabrication method of a display device with viewing angle switching. The display device includes a display module and a guest-host effect box, oppositely configured to each other, where the guest-host effect box is formed on a side of a light exiting surface of the display module; the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules; a first transparent electrode is formed on a surface of the first substrate facing toward the display dielectric layer, and a second transparent electrode is formed on a surface of the second substrate facing toward the display dielectric layer; a first alignment film layer is formed on a surface of the first transparent electrode facing toward the display dielectric layer, and a second alignment film layer is formed on a surface of the second transparent electrode facing toward the display dielectric layer; and an alignment direction of the first alignment film layer and an alignment direction of the second alignment film layer are same and horizontally aligned; a plurality of first alignment regions and second alignment regions alternatingly arranged along a first direction are formed on the first alignment film layer; a plurality of third alignment regions and fourth alignment regions alternatingly arranged along the first direction are formed on the second alignment film layer; an alignment direction of a first alignment region is perpendicular to an alignment direction of a second alignment region; an alignment direction of a third alignment region is perpendicular to an alignment direction of a four alignment region; and the first direction is parallel with a plane of the first substrate; along a direction perpendicular to the light exiting surface of the display module, formed first alignment regions and formed third alignment regions are overlapped, and formed second alignment regions and formed fourth alignment regions are overlapped; and when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode.

Another aspect of the present disclosure provides a display method of a display device with viewing angle switching. The display device includes a display module and a guest-host effect box, oppositely configured to each other, where the guest-host effect box is on a side of a light exiting surface of the display module; the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules; a first transparent electrode is disposed on a surface of the first substrate facing toward the display dielectric layer, and a second transparent electrode is disposed on a surface of the second substrate facing toward the display dielectric layer; and a first alignment film layer is disposed on a surface of the first transparent electrode facing toward the display dielectric layer, and a second alignment film layer is disposed on a surface of the second transparent electrode facing toward the display dielectric layer; an alignment direction of the first alignment film layer and an alignment direction of the second alignment film layer are same and horizontally aligned; the first alignment film layer includes a plurality of first alignment regions and second alignment regions alternatingly disposed along a first direction; an alignment direction of a first alignment region is perpendicular to an alignment direction of a second alignment region; the second alignment film layer includes a plurality of third alignment regions and fourth alignment regions alternatingly disposed along the first direction; and the first direction is parallel with a plane of the first substrate; along a direction perpendicular to the light exiting surface of the display module, the first alignment regions and the third alignment regions are overlapped, and the second alignment regions and the fourth alignment regions are overlapped; and when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode. The display method includes the wide viewing angle mode and the narrow viewing angle mode, where in the narrow viewing angle mode, the bias voltage is not applied to the first transparent electrode and the second transparent electrode of the guest-host effect box, along the first direction, light-transmitting regions and non-light-transmitting regions are alternatingly formed in the display device, and one first alignment region and one second alignment region form a repeated unit corresponding to a repeated unit formed by one light-transmitting region and one non-light-transmitting region; and in the wide viewing angle mode, the bias voltage is applied to the first transparent electrode and the second transparent electrode of the guest-host effect box, and a full light-transmitting region is formed on an entire surface of the display device.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. Drawings incorporated in the specification and forming part of the specification demonstrate embodiments of the present disclosure and, together with the specification, describe the principles of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various exemplary embodiments of the present disclosure will be described in detail with reference to the drawings. It should be noted that the relative arrangements of components and steps, numerical expressions and numerical values set forth in the embodiments are not intended to limit the scope of the present disclosure unless otherwise specified.

The following description of at least one exemplary embodiment is merely illustrative, and not as any limitations on the present disclosure and its application or use.

Techniques, methods and instruments known to those skilled in the art may not be discussed in detail, but where appropriate, the techniques, methods and instruments should be considered as part of the specification.

In all of the examples illustrated and discussed herein, any specific values should be construed as merely illustrative, and not as a limitation. Thus, other examples of the exemplary embodiments may have different values.

It should be noted that similar reference numerals and letters refer to similar items in the following figures, and therefore, once an item is defined in a figure, it is not required to be further discussed in the subsequent figures.

Figure 1:
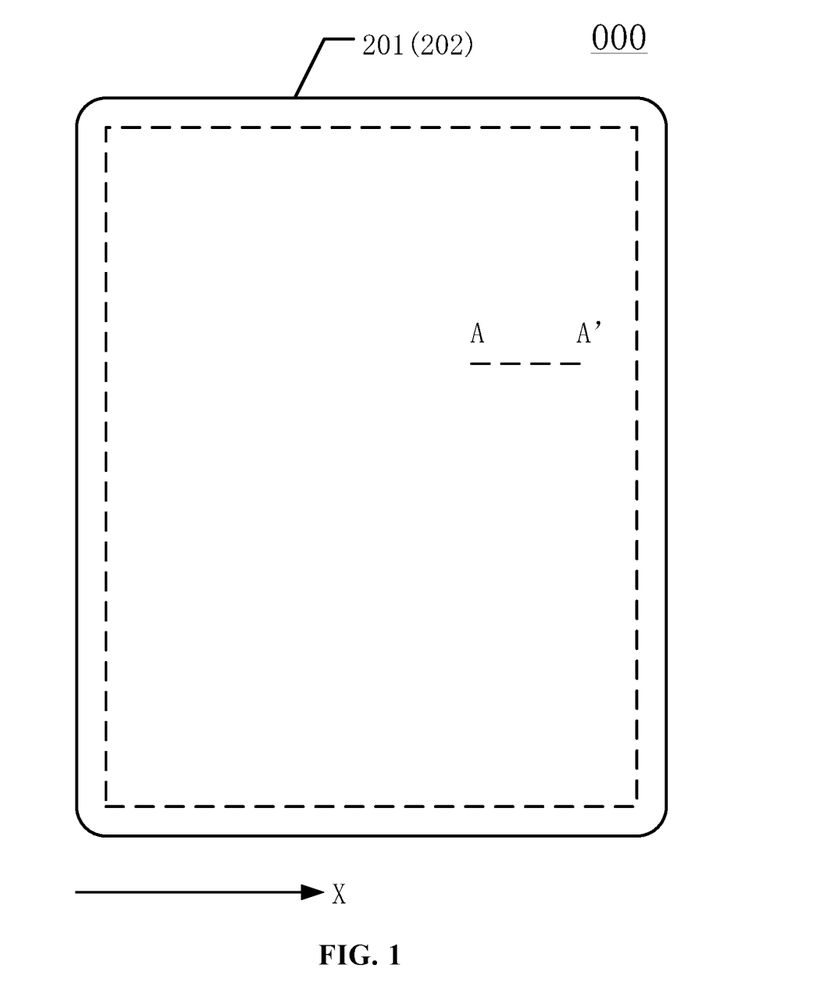
FIG. 1 illustrates a top-view schematic of a display device according to various embodiments of the present disclosure.
Figure 2:
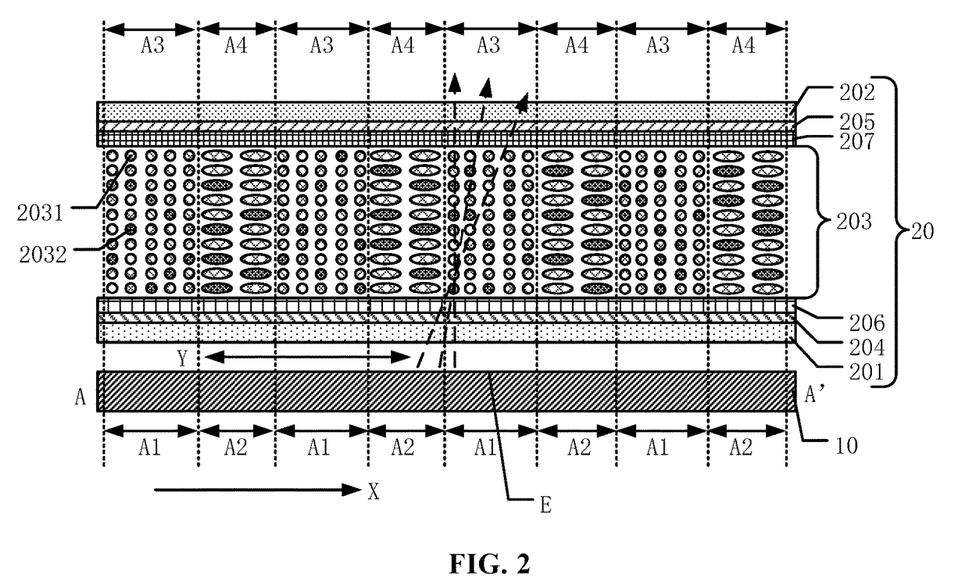
FIG. 2 illustrates a cross-sectional schematic along a cross-sectional line A-A' in FIG. 1.
Figure 3:
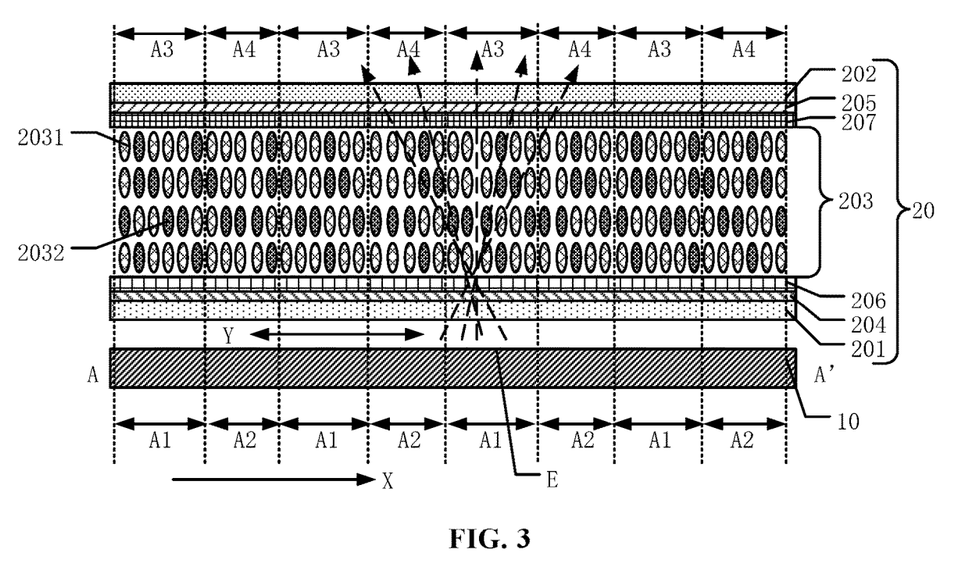
FIG. 3 illustrates another cross-sectional schematic along a cross-sectional line A-A' in FIG. 1.

Referring to FIGS. 1-3, FIG. 1 illustrates a top-view schematic of a display device according to various embodiments of the present disclosure; FIG. 2 illustrates a cross-sectional schematic along a cross-sectional line A-A' in FIG. 1; and FIG. 3 illustrates another cross-sectional schematic along a cross-sectional line A-A' in FIG. 1. A display device 000 for implementing the viewing angle switching provided by embodiments of the present disclosure may include a display module 10 and a guest-host effect box 20 which are opposite to each other. The guest-host effect box 20 may be on a side of a light exiting surface E of the display module 10.

The guest-host effect box 20 may include a first substrate 201 and a second substrate 202 which are opposite to each other, and a display dielectric layer 203 between the first substrate 201 and the second substrate 202. The display dielectric layer 203 may include a plurality of positive liquid crystal molecules 2031 and a plurality of dichroic dye molecules 2032. Optionally, the dichroic dye molecules of the embodiments of the present disclosure may be explained by taking positive dichroic dye molecules as an example.

A first transparent electrode 204 may be disposed on a surface of the first substrate 201 facing toward the display dielectric layer 203, and a second transparent electrode 205 may be disposed on a surface of the second substrate 202 facing toward the display dielectric layer 203.

A first alignment film layer 206 may be disposed on a surface of the first transparent electrode 204 facing toward the display dielectric layer 203, and a second alignment film layer 207 may be disposed on a surface of the second transparent electrode 205 facing toward the display dielectric layer 203.

An alignment direction of the first alignment film layer 206 and an alignment direction of the second alignment film layer 207 may be same and horizontally aligned (shown in FIG. 2, major axis directions of the positive liquid crystal molecules 2031 may be the same as a first direction X, may be perpendicular to a paper direction in FIG. 2, or may be other horizontal directions, but the liquid crystal molecules may be horizontal aligned). The first alignment film layer 206 may include a plurality of first alignment regions A1 and second alignment regions A2 alternatingly disposed along the first direction X. An alignment direction of the first alignment region A1 may be perpendicular to an alignment direction of the second alignment region A2. The second alignment film layer 207 may include a plurality of third alignment regions A3 and fourth alignment regions A4 alternatingly disposed along the first direction X. The first direction X may be parallel with a plane of the first substrate 201.

Along a direction perpendicular to the light exiting surface E of the display module 10, the first alignment regions A1 and the third alignment regions A3 may be overlapped (e.g., coincided with each other), and the second alignment regions A2 and the fourth alignment regions A4 may be overlapped (e.g., coincided with each other). It should be noted that the major axis directions of the positive liquid crystal molecules 2031 in the range of the second alignment regions A2 in FIG. 2 may be the same as the first direction X for exemplary description. Then, after rotating 90 degrees along the horizontal direction, the major axis directions of the positive liquid crystal molecules 2031 in the range of the second alignment regions A2 may be perpendicular to the paper direction in FIG. 2, but the liquid crystal molecules may still be horizontally aligned.

When a bias voltage is not applied to the first transparent electrode 204 and the second transparent electrode 205, a display mode of the display device 000 may be a narrow viewing angle mode; and when the bias voltage is applied to the first transparent electrode 204 and the second transparent electrode 205, the display mode of the display device 000 may be a wide viewing angle mode.

For example, in the embodiments of the present disclosure, the guest-host effect box 20 may be on the side of the light exiting surface E of the display module 10, so the light emitted from the light exiting surface E of the display module 10 may be controlled by the guest-host effect box 20, thereby implementing the wide and narrow viewing angle switching of the device 200.

The guest-host effect box 20 may include the first substrate 201, the second substrate 202, and the display dielectric layer 203 between the first substrate 201 and the second substrate 202. The display dielectric layer 203 may include the plurality of positive liquid crystal molecules 2031 and the plurality of dichroic dye molecules 2032. For the positive liquid crystal molecules 2031, a dielectric constant along the major axis may be larger than a dielectric constant along the minor axis. Therefore, when the positive liquid crystal molecules 2031 are controlled by an electric field, the major axis directions of the positive liquid crystal molecules 2031 may be deflected along a direction parallel with the electric field; and when the positive liquid crystal molecules 2031 are not controlled by the electric field, the major axis directions of the positive liquid crystal molecules 2031 may be the same as the alignment direction of an adjacent alignment film layer. The liquid crystal molecules have an anisotropy of dielectric and refractive index, so the arrangement of the liquid crystal molecules may be changed by the electric field effect.

It should be noted that, in the embodiments of the present disclosure, the positive dichroic dye molecules 2032 may not have dielectric anisotropy (not controlled by the electric field), but the positive dichroic dye molecules 2032 may be dissolved in the main body of the aligned positive liquid crystal molecules 2031, and may be aligned along the same direction as the positive liquid crystal molecules 2031 by following the guest-host effect. Under the action of the electric field, the positive liquid crystal molecules (the host) may be deflected at a certain angle, the positive dichroic dye molecules 2032 (the guest) may be deflected at a corresponding angle by following the deflection of the positive liquid crystal molecules 2031 (the host), thereby exhibiting the guest-host effect. When a polarization (vibration) direction of the linearly polarized light emitted from the display module is parallel with the major axis directions of the positive dichroic dye molecules 2032, the light may be absorbed by the positive dichroic dye molecules 2032, that is, the positive dichroic dye molecules 2032 in the guest-host effect box of the embodiments of the present disclosure may be used to absorb the linearly polarized light or the linearly polarized light components having the polarization direction parallel with the major axis directions of the positive dichroic dye molecules 2032. For example, the positive dichroic dye molecules 2032 may have a rod-like structure, the positive dichroic dye molecules 2032 having different absorption coefficients for visible light along the major axis directions and the minor axis directions may be used as the guest in the embodiments of the present disclosure.

The electric field of the embodiments of the present disclosure may be formed by the first transparent electrode 204 disposed on the surface of the first substrate 201 facing toward the display dielectric layer 203 and the second transparent electrode 205 disposed on the surface of the second substrate 202 facing toward the display dielectric layer 203. By controlling the voltage between the first transparent electrode 204 and the second transparent electrode 205, the deflection angle of the positive dichroic dye molecules 2032 between two transparent electrodes may be controlled. In such way, the positive dichroic dye molecules 2032 (the guest) may be deflected a corresponding angle by following the positive liquid crystal molecules 2031 (the host), and the absorption of the linearly polarized light emitted from the display module 10 by the positive dichroic dye molecules 2032 may also change accordingly.

For example, in the embodiments of the present disclosure, the first alignment film layer 206 may be disposed on a surface of the first transparent electrode 204 facing toward the display dielectric layer 203, and the second alignment film layer 207 may be disposed on a surface of the second transparent electrode 205 facing toward the display dielectric layer 203. In such way, initial major axis deflection directions of the positive liquid crystal molecules 2031 and the plurality of the positive dichroic dye molecules 2032 may be controlled by configuring initial alignment directions of the first alignment film layer 206 and the second alignment film layer 207. For example, when the electric field is not applied to between the first transparent electrode 204 and the second transparent electrode 205 of the guest-host effect box 20, a preset tilt angle of the first alignment film layer 206 and the second alignment film layer 207 adjacent to each other may be configured, such that all positive liquid crystal molecules 2031 adjacent to the surfaces of the first substrate 201 and the second substrate 202 may be horizontally aligned, which may control all major axis directions of the positive liquid crystal molecules 2032 to be a horizontal direction parallel with the plane of the first substrate 201 and the plane of the second substrate 202. At the same time, the alignment direction of the first alignment film layer 206 may be configured as the same as the alignment direction of the second alignment film layer 207; the alignment direction of the first alignment region A1 may be configured to be perpendicular to the alignment direction of the second alignment region A2; and the first alignment regions A1 and the second alignment regions A2 may be configured to be alternatingly disposed. Therefore, the alignment direction of the third alignment region A3 may also be perpendicular to the alignment direction of the fourth alignment region A4, and the third alignment regions A3 and the fourth alignment regions A4 may also be alternatingly disposed. Along the direction perpendicular to the light exiting surface E of the display module 10, the first alignment regions A1 and the third alignment regions A3 may be overlapped (e.g., coincided with each other), and the second alignment regions A2 and the fourth alignment regions A4 may be overlapped (e.g., coincided with each other). That is, when a bias voltage is not applied to the first transparent electrode 204 and the second transparent electrode 205 of the guest-host effect box 20 (shown in FIG. 2), along the first direction X, the display device 000 may form alternating light-transmitting regions (regions corresponding to the first alignment regions A1 and the third alignment regions A3 in FIG. 2) and non-light-transmitting regions (regions corresponding to the second alignment regions A2 and the fourth alignment regions A4 in FIG. 2), where one first alignment region A1 and one second alignment region A2 form a repeated unit corresponding to a repeated unit formed by one light-transmitting region and one non-light-transmitting region. For example, all major axis directions of the positive liquid crystal molecules 2031 and the positive dichroic dye molecules 2032 in the non-light-transmitting regions may be parallel with the polarization direction Y of the linearly polarized light emitted from the light exiting surface E of the display module 10, and the linearly polarized light emitted from the light exiting surface E of the display module 10 may be absorbed in the non-light-transmitting regions; all major axis directions of the positive liquid crystal molecules 2031 and the positive dichroic dye molecules 2032 in the light-transmitting regions may be perpendicular to the polarization direction Y of the linearly polarized light emitted from the light exiting surface E of the display module 10, and the linearly polarized light emitted from the light exiting surface E of the display module 10 may be emitted after passing through the light-transmitting regions.

In the embodiments of the present disclosure, by adding the guest-host effect box 20 (guest-host effect liquid crystal display) above the light exiting surface E of the existing display module 10, when the bias voltage is not applied on the first transparent electrode 204 and the second transparent electrode 205 and the electric field is not formed, the polarization direction Y of the linearly polarized light emitted from the light exiting surface E of the display module 10 may be parallel with the major axis directions of the positive dichroic dye molecules 2032 in a range corresponding to the second alignment regions A2 (or the first alignment regions A1, where the polarization direction Y parallel with the major axis directions of the positive dichroic dye molecules 2032 in the second alignment regions A2 may be exemplarily illustrated in FIG. 2), so the linearly polarized light in the range corresponding to the second alignment regions A2 may be absorbed by the positive dichroic dye molecules 2032; the polarization direction Y of the linearly polarized light emitted from the light exiting surface E of the display module 10 may be perpendicular to the major axis directions of the positive dichroic dye molecules 2032 in a range corresponding to the first alignment regions A1 (or the second alignment regions A2, where the polarization direction Y perpendicular to the major axis directions of the positive dichroic dye molecules 2032 in the first alignment regions A1 may be exemplarily illustrated in FIG. 2), so the linearly polarized light in the range corresponding to the first alignment regions A1 may not be absorbed by the positive dichroic dye molecules 2032 and may be emitted from the corresponding range. In such way, the alternating light-transmitting regions and the non-light-transmitting regions may be formed, where one first alignment region A1 and one second alignment region A2 form the repeated unit corresponding to the repeated unit formed by one light-transmitting region and one non-light-transmitting region, thereby implementing the narrow viewing angle display mode of the display device 000. When the bias voltage is applied to the first transparent electrode 204 and the second transparent electrode 205 (shown in FIG. 3) and an sufficiently large vertical electric field is formed, the major axis directions of the positive liquid crystal molecules 2031 may be the same as the electric field direction after the positive liquid crystal molecules 2031 are deflected, and the positive liquid crystal molecules 2031 may drive the positive dichroic dye molecules 2032 to be deflected together; currently, the polarization direction Y of the linearly polarized light emitted from the light exiting surface E of the display module 10 may not be parallel with all major axis directions of the positive liquid crystal molecules 2031 regardless of the ranges corresponding to the first alignment regions A1 and the second alignment regions A2, so the linearly polarized light entering the guest-host effect box 20 may not be absorbed by the positive dichroic dye molecules 2032 and may be emitted normally from the corresponding ranges, thereby implementing the wide viewing angle display mode of the display device 000. In the embodiments of the present disclosure, the wide and narrow viewing angle switching of the display device 000 may be implemented by reducing the viewing angle brightness. The mode may be the narrow viewing angle mode when it is in a normal state (especially, when power is not on in one embodiment) and may be the wide viewing angle mode when power is on, and complicated drive may not be required and the narrow and wide viewing angle switching may be convenient and desirable.

It should be noted that, in the embodiments of the present disclosure, the first transparent electrode 204 and the second transparent electrode 205 may be formed be depositing a layer of transparent indium tin oxide (ITO) conductive film having high transmittance and high electrical conductivity on the surfaces of the first substrate 201 and the second substrate 202 (e.g., a transparent glass substrate). The major axis directions of the positive dichroic dye molecules 2032 of the embodiment of the present disclosure may change with the major axis directions of the positive liquid crystal molecules 2031 and may always coincide with the major axis directions of the positive liquid crystal molecules 2031. In the embodiments of the present disclosure, a mixing ratio of the positive liquid crystal molecules 2031 and the positive dichroic dye molecules 2032 in the display dielectric layer 203 may not be limited, which may only need to satisfy that the two types of molecules may be uniformly blended, all positive dichroic dye molecules 2032 may be deflected with the positive liquid crystal molecules 2031, and the display device 000 may optimally absorb the linearly polarized light emitted from the light exiting surface of the display module when the display device 000 is in the narrow viewing angle mode, which may not be limited in the embodiments of the present disclosure. In the embodiments of the present disclosure, the first alignment film layer 206 and the second alignment film layer 207 may be formed by printing a polymer film (e.g., polyimide) on the glass substrate (the first substrate 201 and the second substrate 202 in the embodiments of the present disclosure), which may not be limited herein and may not described in detail in the embodiments of the present disclosure.

It should be further noted that the structure of the display module 10 in the embodiments of the present disclosure may not be described in detail and may be understood according to the structure of the display module in the existing technology. The display device 000 in the embodiments of the present disclosure may include a backlight module (not shown) and the like, which may not be described in detail in the embodiments of the present disclosure. In order to clearly illustrate the technical solutions of the present disclosure, a gap may be between the display module 10 and the guest-host effect box 20 in FIG. 2 and FIG. 3 in the embodiments of the present disclosure. However, in an actual production process, the display module 10 and the guest-host effect box 20 may be fixedly connected, and such gap may not exist or may be negligible. For example, the display module 10 and the guest-host effect box 20 may be fixedly connected by a frame glue, a transparent optically clear adhesive (OCA), other bonding methods having a same fixing effect, or other fixing methods, which may not be described in the embodiments of the present disclosure.

It should be further noted that the dichroic dye molecule may be classified into a positive dichroic dye molecule or a negative dichroic dye molecule according to the orientation relationship between an absorption axis and a molecular axis of the dichroic dye molecule. For the positive dichroic dye molecules, when the major axis directions of the positive dichroic dye molecules are perpendicular to the polarization direction of the linearly polarized light, the positive dichroic dye molecules may make the linearly polarized light to be transmitted completely; and when the major axis directions of the positive dichroic dye molecules are parallel with the polarization direction of the linearly polarized light, the positive dichroic dye molecules may absorb the linearly polarized light completely. For the negative dichroic dye molecules, the action may be opposite; when the major axis directions of the negative dichroic dye molecules are perpendicular to the polarization direction of the linearly polarized light, the negative dichroic dye molecules may make absorb the linearly polarized light completely; and when the major axis directions of the negative dichroic dye molecules are parallel with the polarization direction of the linearly polarized light, the negative dichroic dye molecules may make the linearly polarized light to be transmitted completely. That is, in FIG. 2 in one embodiment, if the dichroic dye molecules are negative dichroic dye molecules, the first alignment regions A1 may correspond to non-light-transmitting regions, and the second alignment regions A2 may correspond to light-transmitting regions. In the embodiments of the present disclosure, the positive liquid crystal molecules 2031 and the positive dichroic dye molecules 2032 may be taken as an example for illustrating the technical solutions of the present disclosure. In the actual implementation, the display dielectric layer 203 may also be selected to include other combinations, such as a plurality of negative liquid crystal molecules and a plurality of negative dichroic dye molecules, and the like, thereby designing the display device for implementing the viewing angle switching, which may not be described in detail in the embodiments of the present disclosure, and may be understood by referring to the principle description of the above-mentioned embodiments.

It should be further noted that, in the existing technology, the adjustment of different viewing angles of the liquid crystal display device may be implemented by disposing double liquid crystal cells in the liquid crystal display device. The double liquid crystal cells may be composed of a top liquid crystal layer and a bottom liquid crystal layer, which are aligned vertically. The switching between the narrow viewing angle and the wide viewing angle may be implemented by controlling a voltage applied to the double liquid crystal cells. The method of disposing the double liquid crystal cells may need to control the voltage applied to the double liquid crystal cells, and may implement the switching between the narrow viewing angle and the wide viewing angle by controlling different voltages to change the alignments of the liquid crystal molecules of two liquid crystal layers, which may have a complicated drive method and a high control difficulty. However, in the embodiments of the present disclosure, the switching between the narrow viewing angle and the wide viewing angle may be implemented merely by applying or not applying the bias voltage on the first transparent electrode 204 and the second transparent electrode 205 of the guest-host effect box 20, which may have a simple and convenient control and a low operation difficulty.

Figure 4:
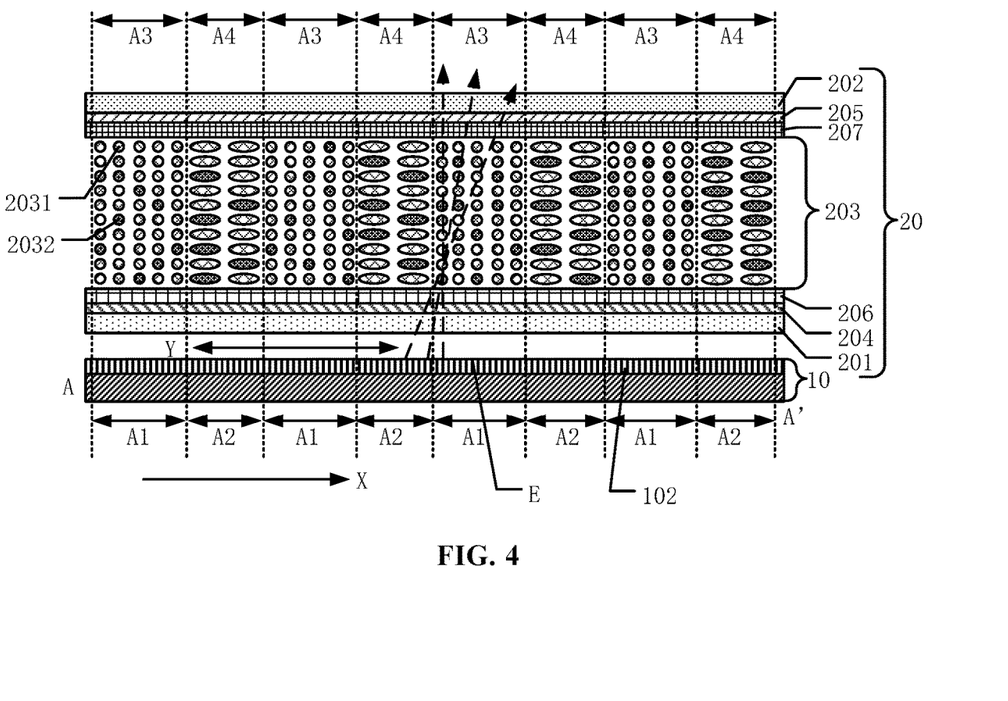
FIG. 4 illustrates another cross-sectional schematic along a cross-sectional line A-A' in FIG. 1.

In some embodiments, referring to FIG. 4, FIG. 4 illustrates another cross-sectional schematic along a cross-sectional line A-A' in FIG. 1. In one embodiment, the display module 10 may include a first polarizer 102, which may be disposed on a side of the display module 10 facing toward the guest-host effect box 20 and may be used to convert the light emitted from the display module 10 into the linearly polarized light.

In the embodiments of the present disclosure, the guest-host effect box 20 may merely absorb the linearly polarized light. Therefore, optionally, the first polarizer 102 may be disposed on the side of the display module 10 facing toward the guest-host effect box 20, thereby ensuring that the light entering the guest-host effect box 20 is the linearly polarized light.

It should be noted that, in one embodiment, the display panel included by the display module 10 may be a liquid crystal display panel and also be an organic light emitting display panel (not shown). The existing technologies implementing the wide and narrow viewing angle switching may be applicable to liquid crystal display devices (LCD) and may not be applicable to self-emitting display devices such as an active matrix organic light emitting diode (AMOLED), micro light emitting diode (micro LED), and the like. However, the present disclosure may also be applicable to display devices including the liquid crystal displays to implement the wide and narrow viewing angle switching. For example, one polarizer may be disposed on the light exiting side of the organic light emitting display panel to convert the light to be emitted into the linearly polarized light (although the organic light emitting display panel may use the polarizer for anti-reflection). That is, the light emitting principle of the organic light emitting display panel may be that light is excited by fluorescence or phosphorescence. For example, the organic semiconductor material and the light emitting material may be driven by an electric field to implement light emitting by carrier injection and recombination, which may be different from the liquid crystal display panel where the liquid crystal molecules may be rotated by an electric field and a light leakage phenomenon may occur when the liquid crystal display panel is viewed from a squint direction, such that the liquid crystal display panel may not have ability of switching between the wide and narrow viewing angles. However, with the structural arrangement of the present disclosure, the self-emitting display panel such as the organic light emitting display panel and the like may be used to implement the switching between the wide and narrow viewing angles with wide application range.

In some embodiments, referring to FIGS. 1-4, the first transparent electrode 204 may be a block structure and an entire surface of the first transparent electrode 204 may be disposed on the first substrate 201; and the second transparent electrode 205 may be a block structure and an entire surface of the second transparent electrode 205 may be disposed on the second substrate 202.

It may be further illustrated that, in the embodiments of the present disclosure, the first transparent electrode 204 and the second transparent electrode 205 may both be entire block structures disposed on the substrates. The display device 000 in the wide viewing angle display mode may need a sufficiently large vertical electric field between the first substrate 201 and the second substrate 202, which may enable that the positive liquid crystal molecules 2031 may be deflected and the major axis directions after deflection may be the same as the direction of the electric field. Therefore, in order to form the vertical electric field between entire first substrate 201 and entire second substrate 202 in the embodiments of the present disclosure, the first transparent electrode 204 may be the block structure and the entire surface of the first transparent electrode 204 may be disposed on the first substrate 201; and the second transparent electrode 205 may be the block structure and the entire surface of the second transparent electrode 205 may be disposed on the second substrate 202. When different voltages are applied to the first transparent electrode 204 and the second transparent electrode 205, a voltage difference may be formed between the first transparent electrode 204 and the second transparent electrode 205 to form the vertical electric field. The magnitude of the vertical electric field may be adjusted by the magnitude of the voltage applied to two transparent electrodes to meet requirements, which may not be described in the embodiments of the present disclosure.

Figure 5:
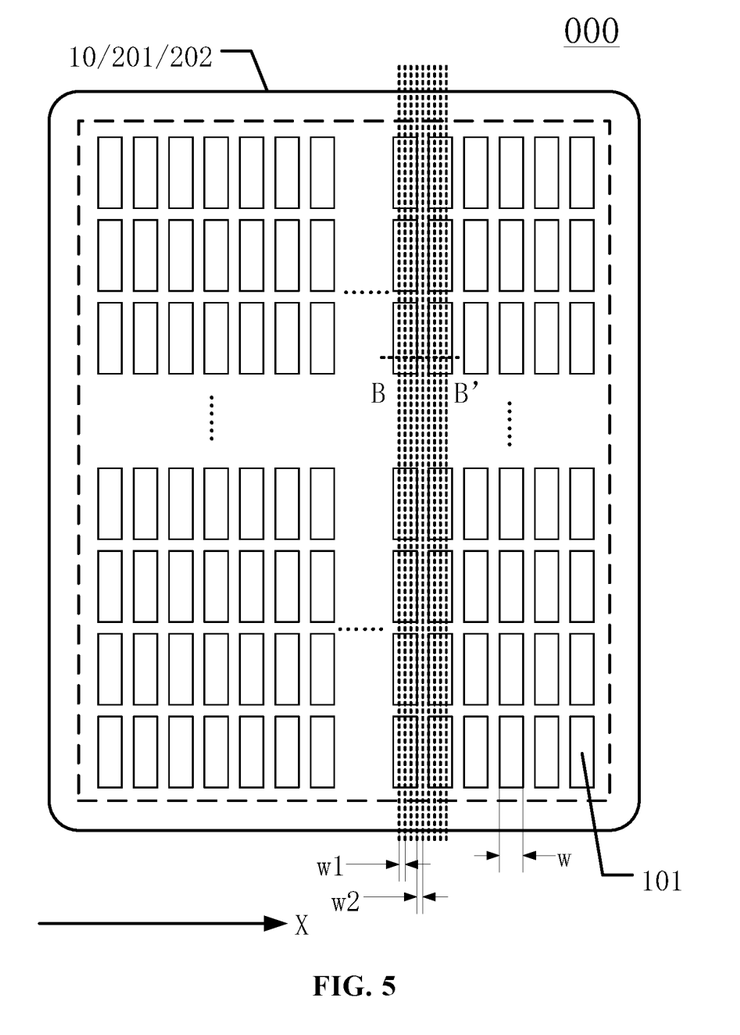
FIG. 5 illustrates a top-view schematic of another display device according to various embodiments of the present disclosure.
Figure 6:
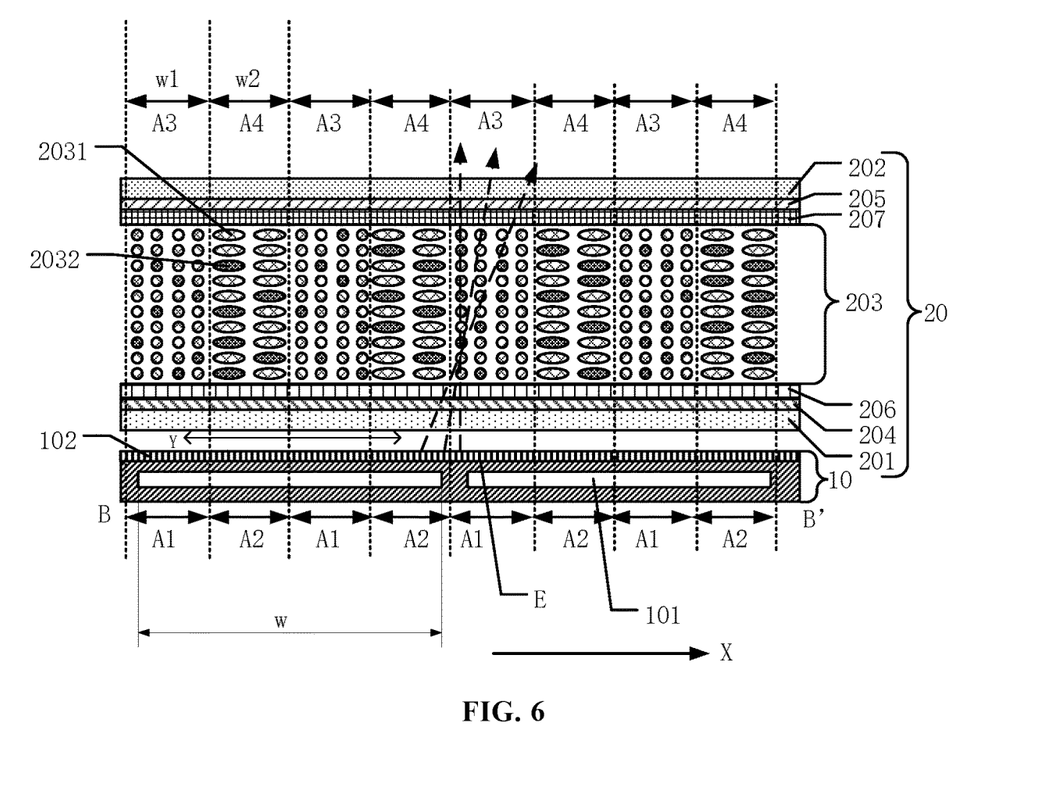
FIG. 6 illustrates a cross-sectional schematic along a cross-sectional line B-B' in FIG. 5.

In some embodiments, referring to FIG. 5 and FIG. 6, FIG. 5 illustrates a top-view schematic of another display device according to various embodiments of the present disclosure; and FIG. 6 illustrates a cross-sectional schematic along a cross-sectional line B-B' in FIG. 5. In the embodiments of the present disclosure, along the first direction X, a width w1 of one first alignment region A1 may be equal to a width w2 of one second alignment region A2.

It may be further illustrated that, in the embodiments of the present disclosure, the width w1 of one first alignment region A1 may be equal to the width w2 of one second alignment region A2 along the first direction X. The range corresponding to the first alignment region A1 may be one of the light-transmitting region and the non-light-transmitting region in the narrow viewing angle display mode of the display device 000, and the range corresponding to the second alignment region A2 may be another one of the light-transmitting region and the non-light-transmitting region in the narrow viewing angle display mode of the display device 000. Therefore, in the embodiments of the present disclosure, the width w1 of one first alignment region A1 may be equal to the width w2 of one second alignment region A2. Compared with that the width w1 of one first alignment region A1 is not equal to the width w2 of one second alignment region A2, the division between the light-transmitting regions and the non-light-transmitting regions may be more evenly in the embodiments of the present disclosure, thereby having a desirable display effect in the narrow viewing angle display mode.

In some embodiments, referring FIG. 5 and FIG. 6, the display module 10 may include a plurality of sub-pixels 101 arranged in an array (not filled in FIGS. 5-6). Along the first direction X, the width w1 of one first alignment region A1 may be less than a width of the sub-pixel 101, and the width w2 of one second alignment region A2 may be less than the width of the sub-pixel 101.

It may be further illustrated that, in the embodiments of the present disclosure, the width w1 of one first alignment region A1 and the width w2 of one second alignment region A2 may both be less than the width of the sub-pixel 101. Optionally, the width w1 of one first alignment region A1 may be equal to the width w2 of one second alignment region A2, such that the division between the light-transmitting regions and the non-light-transmitting regions may be more evenly. Furthermore, the distribution of the first alignment regions A1 and the second alignment regions A2 may be denser, and a quantity of the alignment regions may be larger in the display device having a same area in the embodiments of the present disclosure, thereby enabling the display device 000 to have a desirable narrow viewing angle display effect.

In some embodiments, referring to FIG. 5 and FIG. 6, the width of the sub-pixel 101 may be about 6 to 10 times the width w1 of the first alignment region A1 along the first direction X.

It may further define that, in the embodiments of the present disclosure, the width of the sub-pixel 101 may be about 6 to 10 times the width w1 of the first alignment region A1 along the first direction X. The width w1 of the first alignment region A1 which is too narrow along the first direction may increase the process difficulty and have poor fabrication effect; and the width w1 of the first alignment region A1 which is too wide along the first direction may reduce the quantity of the divided alignment regions, which may be disadvantageous to implement the narrow viewing angle display effect. Therefore, in the embodiments of the present disclosure, the width of the sub-pixel 101 may be about 6 to 10 times the width w1 of the first alignment region A1 along the first direction X, such that the narrow viewing angle display effect may be better implemented without increasing the process difficulty.

In some embodiments, referring to FIGS. 1-6, the display module 10 in the embodiments of the present disclosure may include the display panel, which may be any one of the liquid crystal display panel or the organic light emitting display panel. The liquid crystal display panel may be a display panel with in-plane switching (IPS) mode or a display panel with fringe field switching (FFS) mode.

It may be further illustrated that, in the embodiments of the present disclosure, the display module 10 in the above-mentioned embodiments may include the display panel which may be any one of the liquid crystal display panel or the organic light emitting display panel. The liquid crystal display panel may be any one of a display panel with IPS mode or a display panel with FFS mode.

The liquid crystal panel structure may be a twisted nematic (TN) liquid crystal mode, the IPS mode, the FFS mode and the like.

The IPS mode is a wide viewing angle technology with advantages such as fast response time, high contrast and color saturation, anti-pressing and the like, which is the mainstream technology of mid-end to high-end liquid crystal display panels. Structurally, the liquid crystal drive signal of the IPS mode may be on a plane, that is, two electrodes of the display panel may be fabricated on a same substrate surface, which is different from other liquid crystal modes where the electrodes are vertically arranged on a upper side and a lower side. The special feature of the IPS mode display panel may be that the liquid crystal molecules may not be pre-aligned to the light-transmitting mode, but the non-light-transmitting mode. An amount of transmitted light may be determined by the electrodes perpendicular to the pre-aligned direction of the liquid crystal molecules. The higher the voltage is, the more molecules are twisted, thereby implementing the light precise control. The liquid crystals of the IPS mode display panel may have positive and negative liquid crystals. When a voltage is applied, the liquid crystals may be deflected by the electric field. The light transmittance may be changed by relying on the planar arrangement of the liquid crystal molecules between the electrodes to implement the brightness control, so the alignment may be horizontal, which may also be a normally black mode.

The FFS mode is a wide viewing angle technology developed by the liquid crystal industry for large-size and high-resolution desktop displays and liquid crystal television applications, which is also one of commonly known hard-screen technologies. The display panel with FFS mode may generate a fringe electric field through electrodes between pixels on a same plane, so alignment liquid crystal molecules between electrodes and directly above the electrodes may be rotated and converted along a plane direction parallel with the substrate, thereby improving the light transmission efficiency of the liquid crystal layer. The display panel with FFS mode may overcome low light transmission efficiency of the conventional liquid crystal display panel and achieve high light transmission efficiency under the premise of the wide viewing angle.

It should be noted that, in the embodiments of the present disclosure, it is merely an example that the liquid crystal display panels in the above-mentioned embodiments may be any one of the IPS mode display panels or the FFS mode display panels, which may not be limited to the display panels with such two modes and may be other display panels achieving same or similar effects, which may not be described in detail in the embodiments of the present disclosure.

In some embodiments, referring to FIGS. 1-6, the embodiments of the present disclosure may provide a method for fabricating the display device 000 with the viewing angle switching.

For example, the display device 000 may include the display module 10 and the guest-host effect box 20 which are opposite to each other. The guest-host effect box 20 may be on the side of the light exiting surface E of the display module 10.

The guest-host effect box 20 may include the first substrate 201 and the second substrate 202 which are opposite to each other, and the display dielectric layer 203 between the first substrate 201 and the second substrate 202. The display dielectric layer 203 may include the plurality of positive liquid crystal molecules 2031 and the plurality of dichroic dye molecules 2032.

The first transparent electrode 204 may be disposed on the surface of the first substrate 201 facing toward the display dielectric layer 203, and the second transparent electrode 205 may be disposed on the surface of the second substrate 202 facing toward the display dielectric layer 203. The first alignment film layer 206 may be disposed on the surface of the first transparent electrode 204 facing toward the display dielectric layer 203, and the second alignment film layer 207 may be disposed on the surface of the second transparent electrode 205 facing toward the display dielectric layer 203. The alignment direction of the first alignment film layer 206 may be the same as the alignment direction of the second alignment film layer 207, where both alignment film layers are horizontally aligned.

The plurality of first alignment regions A1 and second alignment regions A2 alternatingly disposed along the first direction X may be formed on the first alignment film layer 206. The plurality of third alignment regions A3 and fourth alignment regions A4 alternatingly disposed along the first direction X may be formed on the second alignment film layer 207. The alignment direction of the first alignment region A1 and the alignment direction of the second alignment region A2 may be perpendicular to each other, and the alignment direction of the third alignment region A3 and the alignment direction of the fourth alignment region A4 may be perpendicular to each other. The first direction X may be parallel with the plane of the first substrate 201.

Along the direction perpendicular to the light exiting surface E of the display module 10, the first alignment regions A1 and the third alignment regions A3 may be overlapped, and the second alignment regions A2 and the fourth alignment regions A4 may be overlapped.

When the bias voltage is not applied to the first transparent electrode 204 and the second transparent electrode 205, the display mode of the display device 000 may be the narrow viewing angle mode; and when the bias voltage is applied to the first transparent electrode 204 and the second transparent electrode 205, the display mode of the display device 000 may be the wide viewing angle mode.

In one embodiment, it may be further illustrated the method for fabricating the display device with the viewing angle switching in the above-mentioned embodiments. The fabrication process of the display module 10 may not be described in detail in one embodiment and may refer to the fabrication process of the display panel in the existing technology. The method for fabricating of the guest-host effect box 20 may be illustrated in the method for fabricating the display device 000 with the viewing angle switching provided by the embodiments of the present disclosure. The display device fabricated by the fabrication method of the embodiments of the present disclosure may have the beneficial effects of the display device 000 with the viewing angle switching in the above-mentioned embodiments and may refer to the description of the display device 000 in various above-mentioned embodiments, which may not be described in detail herein.

In some embodiments, referring to FIGS. 1-6, the display method of the display device with the viewing angle switching may be disclosed in the embodiments of the present disclosure. The display device may include any one of the above-mentioned display devices in the above-mentioned embodiments. The structural schematic of the display device 000 is shown in FIGS. 1-5, and the display method of the display device may include the wide viewing angle mode and the narrow viewing angle mode.

In the narrow viewing angle mode (shown in FIG. 2), the bias voltage may not be applied to the first transparent electrode 204 and the second transparent electrode 205 of the guest-host effect box 20, and the alternating light-transmitting regions and the non-light-transmitting regions may be formed along the first direction in the display device 000, where one first alignment region A1 and one second alignment region A2 form the repeated unit corresponding to the repeated unit formed by one light-transmitting region and one non-light-transmitting region.

In the wide viewing angle mode (shown in FIG. 3), the bias voltage may be applied to the first transparent electrode 204 and the second transparent electrode 205 of the guest-host effect box 20, and the full light-transmitting region may be formed on the entire surface of the display device 000.

For example, for the display method of the display device of the embodiments of the present disclosure, in the narrow viewing angle mode, when the bias voltage is not applied on the first transparent electrode 204 and the second transparent electrode 205 and the electric field is not formed, the polarization direction Y of the linearly polarized light emitted from the light exiting surface E of the display module 10 may be parallel with the major axis directions of the positive dichroic dye molecules 2032 in the range corresponding to the second alignment regions A2, so the linearly polarized light in the range corresponding to the second alignment regions A2 may be absorbed by the positive dichroic dye molecules 2032; the polarization direction Y of the linearly polarized light emitted from the light exiting surface E of the display module 10 may be perpendicular to the major axis directions of the positive dichroic dye molecules 2032 in the range corresponding to the first alignment regions A1, so the linearly polarized light in the range corresponding to the first alignment regions A1 may not be absorbed by the positive dichroic dye molecules 2032 and may be emitted from the corresponding range. In such way, the alternating light-transmitting regions and the non-light-transmitting regions may be formed, where one first alignment region A1 and one second alignment region A2 form the repeated unit corresponding to the repeated unit formed by one light-transmitting region and one non-light-transmitting region. In the wide viewing angle mode, when the bias voltage is applied to the first transparent electrode 204 and the second transparent electrode 205 and the sufficiently large vertical electric field is formed, the major axis directions of the positive liquid crystal molecules 2031 may be the same as the electric field direction after the positive liquid crystal molecules 2031 are deflected, and the positive liquid crystal molecules 2031 may drive the positive dichroic dye molecules 2032 to be deflected together; currently, the polarization direction Y of the linearly polarized light emitted from the light exiting surface E of the display module 10 may not be parallel with all major axis directions of the positive liquid crystal molecules 2031 regardless of the ranges corresponding to the first alignment regions A1 and the second alignment regions A2, so the linearly polarized light entering the guest-host effect box 20 may not be absorbed by the positive dichroic dye molecules 2032 and may be normally emitted from the corresponding ranges, thereby implementing the wide viewing angle display mode of the display device 000. In the embodiments of the present disclosure, the display method of the display device 000 may have two display modes including the narrow viewing angle and the wide viewing angle, respectively. The wide and narrow viewing angle switching may be implemented by reducing the viewing angle brightness. The mode may be the narrow viewing angle mode when it is in a normal state (especially, when power is not on in one embodiment) and may be the wide viewing angle mode when power is on, and complicated drive may not be required and the narrow and wide viewing angle switching may be convenient and desirable.

In some embodiments, referring to FIGS. 1-6, for the narrow viewing angle mode (shown in FIG. 2), the bias voltage may not be applied to the first transparent electrode 204 and the second transparent electrode 205 of the guest-host effect box 20, and the alternating light-transmitting regions and the non-light-transmitting regions may be formed along the first direction in the display device 000, where one first alignment region A1 and one second alignment region A2 form the repeated unit corresponding to the repeated unit formed by one light-transmitting region and one non-light-transmitting region. The example may be the following:

all major axis directions of the positive liquid crystal molecules 2031 and the positive dichroic dye molecules 2032 in the non-light-transmitting regions may be parallel with the polarization direction Y of the linearly polarized light emitted from the light exiting surface E of the display module 10, and the linearly polarized light emitted from the light exiting surface E of the display module 10 may be absorbed in the non-light-transmitting regions; and all major axis directions of the positive liquid crystal molecules 2031 and the positive dichroic dye molecules 2032 in the light-transmitting regions may be perpendicular to the polarization direction Y of the linearly polarized light emitted from the light exiting surface E of the display module 10, and all linearly polarized light emitted from the light exiting surface E of the display module 10 may be emitted after passing through the light-transmitting regions.

In some embodiments, referring to FIGS. 1-6, for the wide viewing angle mode (shown in FIG. 2), the bias voltage may be applied to the first transparent electrode 204 and the second transparent electrode 205 of the guest-host effect box 20, and the full light-transmitting region may be formed on the entire surface of the display device 000. The example may be the following:

the bias voltage is applied to the first transparent electrode 204 and the second transparent electrode 205 and the vertical electric field is formed between the first transparent electrode 204 and the second transparent electrode 205; the vertical electric field may drive the positive liquid crystal molecules 2031 of the display dielectric layer 203 to be deflected, and the positive dichroic dye molecules 2032 may follow the positive liquid crystal molecules 2031 to be deflected; such that, all major axis directions of the positive liquid crystal molecules 2031 and the positive dichroic dye molecules 2032 may be perpendicular to the polarization direction Y of the linearly polarized light emitted from the light exiting surface E of the display module 10, and all linearly polarized light emitted from the light exiting surface E of the display module 10 may be emitted through the guest-host effect box 20.

In some embodiments, referring to FIGS. 1-6, the display device 000 in the range of the first alignment regions A1 may be non-light-transmitting regions and the display device 000 in the range of the second alignment regions A2 may be light-transmitting regions; or the display device 000 in the range of the first alignment regions A1 may be light-transmitting regions and the display device 000 in the range of the second alignment regions A2 may be non-light-transmitting regions.

It may be further illustrated that, in the embodiment of the present disclosure, the display device 000 in the range of the first alignment regions A1 may be designed as the non-light-transmitting regions or light-transmitting regions according to requirements in actual design. In FIGS. 1-6 of the embodiment of the present disclosure, the display device 000 in the range of the first alignment regions A1 may be the non-light-transmitting regions merely as an example for description.

In some embodiments, referring to FIGS. 1-7, FIG. 7 illustrates a structural schematic of a viewing angle principle in a narrow viewing angle mode of a display device according to various embodiments of the present disclosure. In one embodiment, the viewing angle of the narrow viewing angle mode of the display device 000 is $\theta$, and $\tan\theta = w1/d$ or $\tan\theta = w2/d$, where w1 is a width of the first alignment region A1 along the first direction X, w2 is a width of the second alignment region A2 along the first direction X, and d is a thickness of the guest-host effect box 20 in the direction perpendicular to the light exiting surface E of the display module 10.

Figure 7:
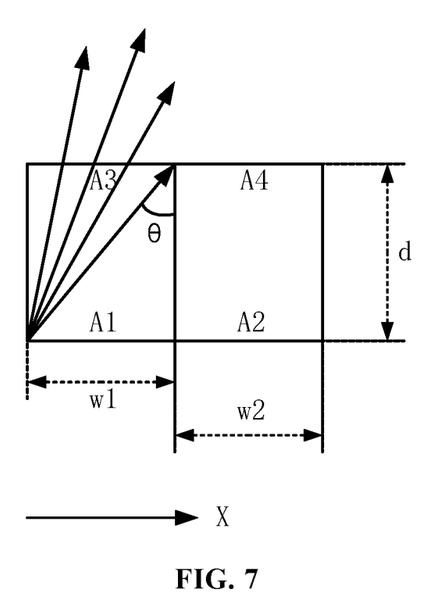
FIG. 7 illustrates a structural schematic of a viewing angle principle in a narrow viewing angle mode of a display device according to various embodiments of the present disclosure.

It may be further illustrated that, in the embodiments of the present disclosure, the viewing angle $\theta$ of the narrow viewing angle mode of the display device 000 may be determined by designing the width of the light-transmitting regions and the thickness of the guest-host effect box 20. Optionally, the range of the viewing angle $\theta$ of the narrow viewing angle mode of the display device 000 is about 45°-60° according to customer requirements, and in order to implement the thinning development of the display device, the thickness d of the guest-host effect box 20 along the direction perpendicular to the light exiting surface E of the display module 10 may not be too large, for example, about 5 μm to about 10 μm, thereby facilitating the thinning development of the display device while satisfying the narrow viewing angle mode within a certain viewing angle range. Furthermore, when the first alignment region A1 corresponds to the light-transmitting region in the display device, $\tan\theta = w1/d$ and the viewing angle $\theta$ of the narrow viewing angle mode may be calculated by the width of the first alignment region A1 along the first direction X and the thickness of the guest-host effect box 20 along the direction perpendicular to the light exiting surface E of the display module 10. Optionally, the brightness loss of the display device in current narrow viewing angle mode is: $w2/(w1+w2) \times 100\%$. When the second alignment region A2 corresponds to the light-transmitting region in the display device, $\tan\theta = w2/d$ and the viewing angle $\theta$ of the narrow viewing angle mode may be calculated by the width of the second alignment region A2 along the first direction X and the thickness of the guest-host effect box 20 along the direction perpendicular to the light exiting surface E of the display module 10. Optionally, the brightness loss of the display device in current narrow viewing angle mode is: $w1/(w1+w2) \times 100\%$. It should be noted that the width w1 of the first alignment region A1 along the first direction X and the width w2 of the second alignment region A2 along the first direction X may be same or different, which may be configured according to actual implementation conditions.

From the above-mentioned embodiments, it can be noted that the display device with viewing angle switching, and its display method and fabrication method provided by the present disclosure may achieve at least the following beneficial effects.

In the present disclosure, the guest-host effect box may be on the side of the light exiting surface of the display module, so the light emitted from the light exiting surface of the display module may be controlled by the guest-host effect box, thereby implementing the narrow and wide viewing angle switching of the display device. When the bias voltage is not applied on the first transparent electrode and the second transparent electrode and the electric field is not formed, the polarization direction of the linearly polarized light emitted from the light exiting surface of the display module may be parallel with the major axis directions of the dichroic dye molecules (the dichroic dye molecules of the present disclosure may be positive dichroic dye molecules as an example) in the range corresponding to the second alignment regions, so the linearly polarized light in the range corresponding to the second alignment regions may be absorbed by the positive dichroic dye molecules; the polarization direction of the linearly polarized light emitted from the light exiting surface of the display module may be perpendicular to the major axis directions of the positive dichroic dye molecules in the range corresponding to the first alignment regions, so the linearly polarized light in the range corresponding to the first alignment regions may not be absorbed by the positive dichroic dye molecules and may be emitted from the corresponding range; such that the alternating light-transmitting regions and the non-lighttransmitting may be formed, where one first alignment region and one second alignment region form the repeated unit corresponding to the repeated unit formed by one light-transmitting region and one non-light-transmitting region, thereby implementing the narrow viewing angle display mode of the display device. When the bias voltage is applied to the first transparent electrode and the second transparent electrode and the sufficiently large vertical electric field is formed, the major axis directions of the positive liquid crystal molecules may be the same as the electric field direction after the positive liquid crystal molecules are deflected, and the positive liquid crystal molecules may drive the positive dichroic dye molecules to be deflected together; currently, the polarization directions of the linearly polarized light emitted from the light exiting surface of the display module may not be parallel with all major axis directions of the positive liquid crystal molecules regardless of the ranges corresponding to the first alignment regions and the second alignment regions, so the linearly polarized light entering the guest-host effect box may not be absorbed by the positive dichroic dye molecules and may be emitted normally, thereby forming the wide viewing angle display mode of the display device. In the embodiments of the present disclosure, the wide and narrow viewing angle switching may be implemented by reducing the viewing angle brightness. The mode may be the narrow viewing angle mode when it is in a normal state (especially, when power is not on in one embodiment) and may be the wide viewing angle mode when power is on; and complicated driving may not be required and the narrow and wide viewing angle switching may be convenient and desirable.

The details of the present disclosure have been described through the embodiments provided above. However, those skilled in the art should understand that the disclosed embodiments are exemplary only and are not intended to limit the scope of the present disclosure. Those skilled in the art should understand that the disclosed embodiments can be modified according to the scope and principles of the present disclosure. The scope of the present disclosure is defined by the appended claims and their equivalents.

What is claimed is:

1. A display device with viewing angle switching, comprising:
   a display module and a guest-host effect box, oppositely configured to each other, wherein:
   the guest-host effect box is on a side of a light exiting surface of the display module;
   the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules;
   a first transparent electrode is disposed on a surface of the first substrate facing toward the display dielectric layer, and a second transparent electrode is disposed on a surface of the second substrate facing toward the display dielectric layer; and a first alignment film layer is disposed on a surface of the first transparent electrode facing toward the display dielectric layer, and a second alignment film layer is disposed on a surface of the second transparent electrode facing toward the display dielectric layer;
   an alignment direction of the first alignment film layer and an alignment direction of the second alignment film layer are same and horizontally aligned; the first alignment film layer includes a plurality of first alignment regions and second alignment regions alternatingly disposed along a first direction; an alignment direction of a first alignment region is perpendicular to an alignment direction of a second alignment region; the second alignment film layer includes a plurality of third alignment regions and fourth alignment regions alternatingly disposed along the first direction; and the first direction is parallel with a plane of the first substrate;
   along a direction perpendicular to the light exiting surface of the display module, the first alignment regions and the third alignment regions are overlapped, and the second alignment regions and the fourth alignment regions are overlapped; and
   when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode.

2. The display device according to claim 1, wherein:
   the display module includes a first polarizer which is disposed on a side of the display module facing toward the guest-host effect box and is used to convert light emitted from the display module into linearly polarized light.

3. The display device according to claim 1, wherein:
   the first transparent electrode is a block structure and an entire surface of the first transparent electrode is disposed on the first substrate; and
   the second transparent electrode is a block structure and an entire surface of the second transparent electrode is disposed on the second substrate.

4. The display device according to claim 1, wherein:
   along the first direction, a width of one first alignment region substantially equals a width of one second alignment region.

5. The display device according to claim 1, wherein:
   the display module includes a plurality of sub-pixels arranged in an array; and
   along the first direction, a width of one first alignment region is less than a width of a sub-pixel, and a width of one second alignment region is less than the width of the sub-pixel.

6. The display device according to claim 5, wherein:
   along the first direction, the width of the sub-pixel is about 6 to 10 times the width of one first alignment region.

7. The display device according to claim 1, wherein:
   the display module includes a display panel,
   the display panel includes a liquid crystal display panel or an organic light emitting display panel; and
   the liquid crystal display panel is a display panel with an in-plane switching (IPS) mode or a display panel with a fringe field switching (FFS) mode.

8. A method for forming a display device with viewing angle switching, the method comprising:
   configuring a display module and a guest-host effect box opposite to each other, wherein:
   the guest-host effect box is on a side of a light exiting surface of the display module;
   the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules;

a first transparent electrode is formed on a surface of the first substrate facing toward the display dielectric layer, and a second transparent electrode is formed on a surface of the second substrate facing toward the display dielectric layer; a first alignment film layer is formed on a surface of the first transparent electrode facing toward the display dielectric layer, and a second alignment film layer is formed on a surface of the second transparent electrode facing toward the display dielectric layer; and an alignment direction of the first alignment film layer and an alignment direction of the second alignment film layer are same and horizontally aligned;

a plurality of first alignment regions and second alignment regions alternatingly arranged along a first direction are formed on the first alignment film layer; a plurality of third alignment regions and fourth alignment regions alternatingly arranged along the first direction are formed on the second alignment film layer; an alignment direction of a first alignment region is perpendicular to an alignment direction of a second alignment region; an alignment direction of a third alignment region is perpendicular to an alignment direction of a four alignment region; and the first direction is parallel with a plane of the first substrate;

along a direction perpendicular to the light exiting surface of the display module, formed first alignment regions and formed third alignment regions are overlapped, and formed second alignment regions and formed fourth alignment regions are overlapped; and when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode.

9. The method according to claim 8, wherein:
the display module includes a first polarizer which is disposed on a side of the display module facing toward the guest-host effect box and is used to convert light emitted from the display module into linearly polarized light.

10. The method according to claim 8, wherein:
the first transparent electrode is a block structure and an entire surface of the first transparent electrode is disposed on the first substrate; and
the second transparent electrode is a block structure and an entire surface of the second transparent electrode is disposed on the second substrate.

11. The method according to claim 8, wherein:
along the first direction, a width of one first alignment region substantially equals a width of one second alignment region.

12. The method according to claim 8, wherein:
the display module includes a plurality of sub-pixels arranged in an array; and
along the first direction, a width of one first alignment region is less than a width of a sub-pixel, and a width of one second alignment region is less than the width of the sub-pixel.

13. The method according to claim 12, wherein:
along the first direction, the width of the sub-pixel is about 6 to 10 times the width of one first alignment region.

14. The method according to claim 8, wherein:
the display module includes a display panel,
the display panel includes a liquid crystal display panel or an organic light emitting display panel; and
the liquid crystal display panel is a display panel with an in-plane switching (IPS) mode or a display panel with a fringe field switching (FFS) mode.

15. A display method of a display device with viewing angle switching, wherein:
the display device includes a display module and a guest-host effect box, oppositely configured to each other, wherein:
the guest-host effect box is on a side of a light exiting surface of the display module;
the guest-host effect box includes a first substrate and a second substrate, oppositely configured to each other, and a display dielectric layer between the first substrate and the second substrate; and the display dielectric layer includes a plurality of positive liquid crystal molecules and a plurality of dichroic dye molecules;
a first transparent electrode is disposed on a surface of the first substrate facing toward the display dielectric layer, and a second transparent electrode is disposed on a surface of the second substrate facing toward the display dielectric layer; and a first alignment film layer is disposed on a surface of the first transparent electrode facing toward the display dielectric layer, and a second alignment film layer is disposed on a surface of the second transparent electrode facing toward the display dielectric layer;
an alignment direction of the first alignment film layer and an alignment direction of the second alignment film layer are same and horizontally aligned; the first alignment film layer includes a plurality of first alignment regions and second alignment regions alternatingly disposed along a first direction; an alignment direction of a first alignment region is perpendicular to an alignment direction of a second alignment region; the second alignment film layer includes a plurality of third alignment regions and fourth alignment regions alternatingly disposed along the first direction; and the first direction is parallel with a plane of the first substrate;
along a direction perpendicular to the light exiting surface of the display module, the first alignment regions and the third alignment regions are overlapped, and the second alignment regions and the fourth alignment regions are overlapped; and
when a bias voltage is not applied to the first transparent electrode and the second transparent electrode, a display mode of the display device is a narrow viewing angle mode; and when the bias voltage is applied to the first transparent electrode and the second transparent electrode, the display mode of the display device is a wide viewing angle mode; and
the display method includes the wide viewing angle mode and the narrow viewing angle mode, wherein:
in the narrow viewing angle mode, the bias voltage is not applied to the first transparent electrode and the second transparent electrode of the guest-host effect box, along the first direction, light-transmitting regions and non-light-transmitting regions are alternatingly formed in the display device, and one first alignment region and one second alignment region form a repeated unit corresponding to a repeated unit formed by one light-transmitting region and one non-light-transmitting region; and in the wide viewing angle mode, the bias voltage is applied to the first transparent electrode and the second transparent electrode of the guest-host effect box, and a full light-transmitting region is formed on an entire surface of the display device.

16. The method according to claim 15, wherein:

in the narrow viewing angle mode, the bias voltage is not applied to the first transparent electrode and the second transparent electrode of the guest-host effect box, along the first direction, the light-transmitting regions and the non-light-transmitting regions are alternatingly formed in the display device, and one first alignment region and one second alignment region form the repeated unit corresponding to the repeated unit formed by one light-transmitting region and one non-light-transmitting region, wherein:

all major axis directions of the positive liquid crystal molecules and the dichroic dye molecules in the non-light-transmitting regions are parallel with a polarization direction of linearly polarized light emitted from the light exiting surface of the display module, and the linearly polarized light emitted from the light exiting surface of the display module is absorbed in the non-light-transmitting regions; and all major axis directions of the positive liquid crystal molecules and the dichroic dye molecules in the light-transmitting regions are perpendicular to the polarization direction of the linearly polarized light emitted from the light exiting surface of the display module, and the linearly polarized light emitted from the light exiting surface of the display module is emitted after passing through the light-transmitting regions, wherein the dichroic dye molecules are positive dichroic dye molecules.

17. The method according to claim 15, wherein:

in the wide viewing angle mode, the bias voltage is applied to the first transparent electrode and the second transparent electrode of the guest-host effect box, and the full light-transmitting region is formed on the entire surface of the display device, wherein:

the bias voltage is applied to the first transparent electrode and the second transparent electrode to form an vertical electric field between the first transparent electrode and the second transparent electrode; the vertical electric field drives the positive liquid crystal molecules of the display dielectric layer to be deflected, and the dichroic dye molecules are deflected by following the positive liquid crystal molecules; such that, all major axis directions of the positive liquid crystal molecules and the dichroic dye molecules are perpendicular to a polarization direction of linearly polarized light emitted from the light exiting surface of the display module, and the linearly polarized light emitted from the light exiting surface of the display module is emitted through the guest-host effect box.

18. The method according to claim 15, wherein:

a non-light-transmitting region is in a range of the first alignment region of the display device, and a light-transmitting region is in a range of the second alignment region of the display device; or a light-transmitting region is in a range of the first alignment region of the display device, and a non-light-transmitting region is in a range of the second alignment region of the display device.

19. The method according to claim 15, wherein:

a viewing angle of the narrow viewing angle mode is θ, and tan θ=w1/d or tan θ=w2/d, wherein:

w1 is a width of the first alignment region along the first direction, w2 is a width of the second alignment region along the first direction, and d is a thickness of the guest-host effect box along the direction perpendicular to the light exiting surface of the display module.

20. The method according to claim 15, wherein:

the first transparent electrode is a block structure and an entire surface of the first transparent electrode is disposed on the first substrate; and the second transparent electrode is a block structure and an entire surface of the second transparent electrode is disposed on the second substrate.

\* \* \* \* \*